April 14, 1925.                       1,533,740

G. KEINATH

PYROMETER

Filed Aug. 27, 1921

Inventor
Georg Keinath.
by Knight Bros
      Attorneys

Patented Apr. 14, 1925.

1,533,740

UNITED STATES PATENT OFFICE.

GEORG KEINATH, OF BERLIN-CHARLOTTENBURG, GERMANY, ASSIGNOR TO SIEMENS & HALSKE, AKTIENGESELLSCHAFT, OF SIEMENSSTADT, NEAR BERLIN, GERMANY, A CORPORATION OF GERMANY.

PYROMETER.

Application filed August 27, 1921. Serial No. 495,914.

*To all whom it may concern:*

Be it known that I, GEORG KEINATH, a citizen of Germany, residing at Berlin-Charlottenburg, Germany, have invented certain new and useful Improvements in Pyrometers, for which I have filed application in Germany, June 6, 1920, D. R. G. M. No. 762342/21b; 10. 1. 1921, Ser. No. S.55277 IX/42i; 16. 4. 1921, Ser. No. S.56204 IX/42i; 7. 1. 1921, D. R. G. M. No. 778233/42i; 7. 1. 1921, D. R. G. M. No. 778232/42i.

My invention refers to pyrometers and more especially to instruments of the kind aforesaid connected with one or a plurality of thermo elements enclosed within a vacuum tube and which are influenced by the radiation to be measured.

As is well known to those skilled in the art, such pyrometers involve the drawback that the measured value of the thermo element is affected by conditions, varying under the influence of the radiation, such that this measured value may vary to a considerable extent, thereby unfavourably influencing the accuracy and speed of measuring. It has been ascertained for instance, that the thermo element, instead of reaching at once the final condition corresponding to the radiation to be measured, will cause the measuring instrument to first pass beyond the final position to return to it only gradually. This may result in false readings because the measuring instrument requires some time before reaching its final deflection.

It has further been found that the deflection occurring at the beginning of the measuring operation in the measuring instrument registering the thermo current and which is merely caused by the soldered junction heated by the radiation to be measured, decreases considerably, as the adjoining portions of the thermo element and quite especially the cold soldered junctions are gradually becoming heated. In such a case the deflection may go down to about one half of its original value.

I have ascertained that these drawbacks are mainly due to the fact that the warm soldered junction being directly exposed to the action of the rays reaches its final temperature more quickly than the cold soldered junction, to which the heat is conducted only gradually and indirectly, and that therefore the soldered junction of the thermo element requires a compensation providing that the cold and warm soldered junctions be uniformly influenced by the temperature, thereby compensating the effect of the drop of voltage mentioned above.

In the following I shall describe some of the means which I have found suitable for obviating these drawbacks.

In the drawings affixed to this specification and forming part thereof, different devices embodying my invention are illustrated diagrammatically by way of example.

In the drawings—

Figure 1:
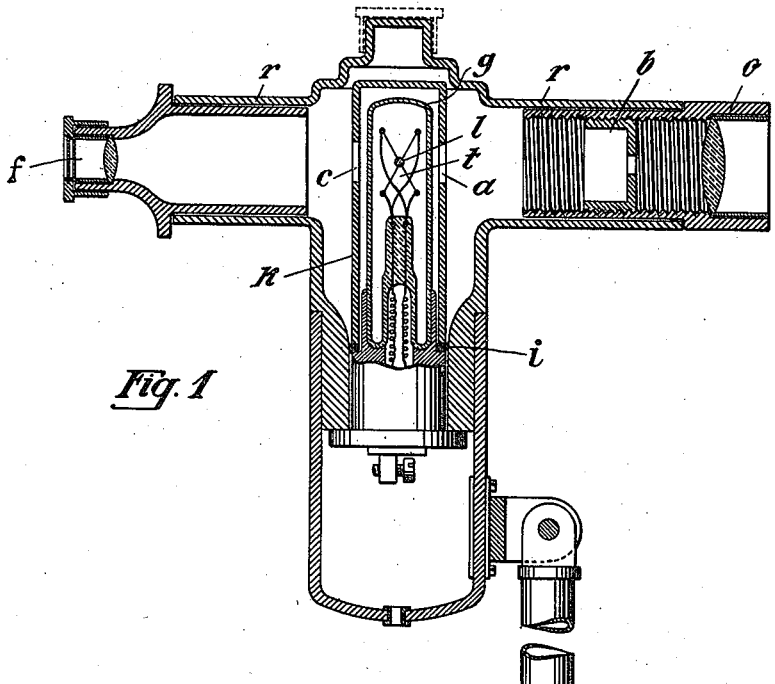
Fig. 1 is a longitudinal section of a radiation pyrometer according to the present invention, allowing the compensation of the thermo element as desired.

Referring now to Fig. 1 of the drawings, the device here disclosed allows the thermo element to be compensated and the measuring value to be corrected by permitting a variable quantity of rays to be thrown onto the pyrometer tube. $r$ is the pyrometer tube. $t$ is the thermal element enclosed in the evacuated glass tube $g$ and $b$ is an adjustable diaphragm disposed in front of the thermo element and serving for regulating the bundle of rays thrown by the heated part to be measured (not shown) through the lens $o$ on to the soldered junction $l$ of the thermo element. $f$ is an eye-piece for observation and for properly focusing the rays on the thermo element. The diaphragm $h$ may be provided with a constant opening and be arranged displaceably, for instance by threading it into the pyrometer tube as shown.

In the drawing there is shown a further means for dimensioning the bundle of rays. The thermo element is provided with a metal cap $k$, having two openings $a$ and $o$ disposed in axial alinement with the pyrometer tube. In consequence thereof only those heat rays, entering through the lens $o$, which are predetermined in proportion to the width of the opening $a$ enter the cap and reach directly the warm soldered junction of the thermo element. The rest of the rays will heat the cap, and the heat imparted to the latter is now transferred by the cap itself as also by the conductors on to the cold soldered junction. By varying the dimensions of the cap and more especially of the opening $a$ a perfect compensation of the heat transmission has been shown to be possible, the warm and the cold soldered junctions of the thermo element reaching their final temperature simultaneously whereby a deflection of the measuring device beyond the final position of the pointer is thus avoided.

By disposing the cap within the casing of the pyrometer in such a manner that its walls are not in direct contact with the walls of the tube, the further advantage is obtained that the element is protected from the influence of a variation of temperature of the outer air, thus avoiding a further source of error.

This is obtained in the pyrometer disclosed in Fig. 1 of the drawing by disposing the cap on the socket of the thermo element in such a manner for instance by means of an insulating ring $i$, that the heat imparted to it is transmitted only onto the upper part of the socket, which is not in contact with the casing itself and moreover is preferably insulated from the lower part of the socket which forms the connection with the casing.

Although the arrangement, described at the beginning, of an adjustable diaphragm disposed within the lens carrier of the pyrometer tube is rendered superfluous by this latter arrangement in so far as the cap $k$ and its opening $a$ substantially act after the manner of a diaphragm and provide for a suitable dimensioning of the bundle of rays thrown onto the thermo element, the diaphragm $b$ may still be used as an additional means, more particularly for regulating the sensitivity of the element.

In case however that it should be desired to dispense with a separate diaphragm for regulating the sensitiveness at will, this particular effect of the diaphragm $b$ may be obtained by exchanging the cap $k$ for another cap having an opening $a$ suitable for the prevailing conditions.

As mentioned above, the instrument disclosed in Fig. 1 of the drawing merely permits compensating the thermo element from case to case. In contradistinction thereto the two arrangements disclosed in Figs. 2 and 3 serve for automatically compensating the irregularities arising in the thermo element.

Figure 2:
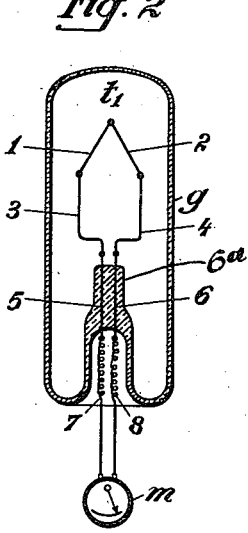
Fig. 2 is a similar view, drawn to a larger scale, of an instrument permitting the irregularities arising in the thermo element to be compensated automatically.

Referring to Fig. 2, $t^1$ is a thermo element disposed within a vacuum tube $g$ and consisting of a constantan wire 1 and a nickel chromium wire 2. The two ends of the element are connected by soldering to these wires two wires 3 and 4, the constantan wire 1 being soldered to a nickel wire 3 and the nickel chromium wire 2 to a copper wire 4. The wires 3 and 4 are connected with the two platinum wires 5 and 6 at the place where the platinum wires project above the glass stem $6^a$. To these platinum wires there are also connected the conductors 7 and 8 leading to the measuring instrument $m$.

The soldered junctions between the wires 1 and 3 on the one hand, and 2 and 4 on the other hand on becoming hot cause electromotive forces to be generated which are added to the electromotive force by the thermo element 1—2 exposed to radiation heat. In this way they compensate the drop of electromotive force occurring when the parts of the thermo element adjoining the warm soldered junction and more especially the cold soldered parts are heated. In consequence thereof the deflection of the pointer of the measuring instrument will remain constant so long as the irradiation of the thermo element does not change.

In an arrangement of the kind described there is still the possibility of the pyrometer showing a certain inertia since, when the radiation to be measured disappears of a sudden, the additional electromotive forces will at first remain present.

Figure 3:
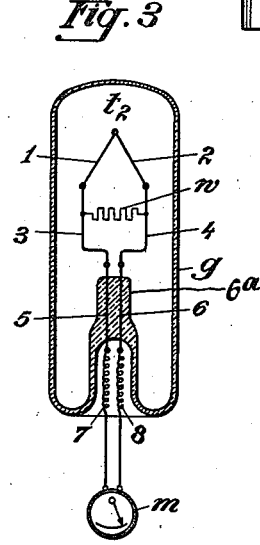
Fig. 3 is a similar view of a third modification permitting a quicker reading of the measuring instrument.

This possibility is avoided in the device disclosed in Fig. 3 of the drawing. The general arrangement of parts is similar to that described in connection with Fig. 2. Both connecting wires 3 and 4 connecting the shanks 1 and 2 of the thermo element $t^2$ are made of constantan. Compensation is obtained here by a resistance $w$ connected in parallel to the shanks 1 and 2 of the thermo element $t^2$, the resistance increasing with an increase in temperature. This resistance is dimensioned in such a manner that at increased temperature of the surroundings of the thermo element the current supplied to the measuring instrument becomes greater while the current flowing through the resistance itself is diminished.

The compensating arrangements illustrated in Figs. 2 and 3 of the drawing involve a certain drawback in so far as they do not allow subsequently varying or adjusting the compensation factor, owing to the fact that the parts serving to effect compensation are not accessible, being arranged within the vacuum tube.

Figure 4:
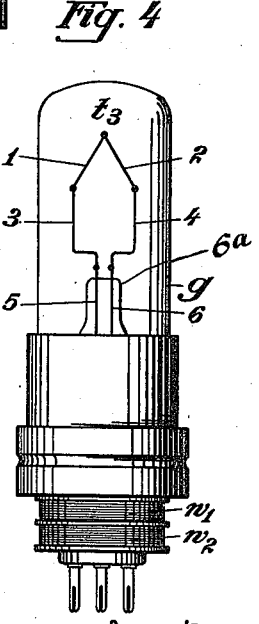
Fig. 4 is a similar view of a fourth modification, permitting easy access to the parts serving for compensation.

In the arrangement disclosed in Fig. 4 of the drawing this drawback is avoided. The thermo element $t^3$ which is substantially similar to that described with reference to Fig. 2, consists of the glass tube $g$ with the wires 1 and 2 forming the element, the two compensating wires 3 and 4, the platinum wires 5 and 6 and the connecting wires beyond which are not shown. The resistance $w$ provided in the device according to Fig. 3 for compensating the thermo currents is here disposed on the socket in an easily accessible manner, being represented by a coil $w^1$ connected in parallel to the two soldered junctions of the element. The temperature coefficient of the coil $w^1$ is so chosen that as the temperature of the cold soldered junction rises, the resistance in the coil increases, and in consequence thereof the current supplied by the electromotive force of the thermo element and flowing through the measuring instrument is increased in proportion. The coefficient of resistance of the coil can be made variable by well known means, so that by aid of this arrangement any desired variation or adjustment of the compensation of the thermo element is rendered possible.

Fig. 4 further shows means rendering it possible to mutually compensate the thermo elements and allowing to replace in a very simple manner a damaged thermo element by a fresh one.

As shown in the drawing, the socket of the thermo element carries besides the resistance coil $w^1$ serving for compensating the thermo currents a coil $w^2$ which is connected in series with one of its two paths of current. The resistance value of this coil is chosen from the beginning in such a manner that all elements assembled in one series have a like coefficient of compensation. The coil $w^2$ may be replaced by other suitable compensating means. Furthermore, if desired, both paths of current of the element may be provided with such compensating means.

The thermo element may be rendered still more easily replaceable if the holder and more especially the socket or cap are standardized. Preferably the cap is given a shape allowing a quick and simple mounting. A thermo element having only two paths of current may for instance be provided with an Edison or a Swan cap with the corresponding holder, while for a thermo element provided with more than two connecting wires a cap may be used which is provided with the corresponding number of plugs, said cap being introduced in a holder provided with a corresponding number of sleeves.

I wish it to be understood that I do not desire to be limited to the exact construction shown and described, for many obvious modifications will occur to a person skilled in the art.

I claim:—

1. In a pyrometer of the character described in combination a thermo element, means for leading a part of the heat rays from the body to be measured directly to the warm soldered junction of said thermo element and means for transmitting such an extent of heat of another part of the heat rays from the body to be measured to the cold soldered junctions so that both of said warm and cold junctions will reach their respective final temperatures simultaneously.

2. In a pyrometer of the character described in combination a T-shaped casing having an opening in one arm adapted to be directed towards the hot body and an eye-piece in the opposed arm, said casing also having an opening in the middle shank, a thermo element, a vessel containing said thermo element, a socket arranged at one end of said vessel, said vessel being inserted in the opening of said middle shank, and a cap covering the opening and the outer part of the socket.

3. In a pyrometer of the character described in combination a T-shaped casing having an opening in one arm adapted to be directed towards the hot body and an eye-piece in the opposed arm, said casing also having an opening in the middle shank, a thermo element, a vessel, containing said thermo element, a socket arranged at one end of said vessel, said vessel being inserted in the opening of said middle shank, and a cap covering the opening and the outer part of the socket, a diaphragm adjustably disposed in the arm facing the hot body and a lens in said arm located between said diaphragm and the hot body.

4. In a pyrometer of the character described in combination a casing having an opening at one end and adapted to be directed towards the hot body and an eye-piece at the other end, a thermo element enclosed in a vessel of transparent material, a socket fastened to the bottom of said vessel and mounted in said casing, a cap enclosing the vessel of said thermo element, said cap being provided with diametrically oppositely arranged openings permitting the passage of the heat rays entering the casing directly to the warm soldered junction of the element and to the eye-piece of the casing.

5. In a pyrometer of the character described in combination, a T-shaped casing having an opening in one of its arms adapted to be directed towards the hot body to be measured and an eye-piece in the opposed arm, said casing having an opening in the middle arm, a thermo element, an evacuated vessel containing said element and being provided with a socket mounted in said middle arm, a body of heat insulating material between the metallic parts of the vessel and the casing shank, a cap arranged over the vessel, said cap being provided with diametrically oppositely arranged openings located in the axis of the first two arms of the casing, the hot soldered junctions of the element being in alinement with aforesaid axis.

6. In a pyrometer of the character described in combination, a T-shaped casing having an opening in one of its arms adapted to be directed towards the hot body to be measured and an eye-piece in the opposed arm, said casing having an opening in the middle arm, a thermo element, an evacuated vessel containing said element and being provided with a socket mounted in said middle arm, a body of heat insulating material between the metallic parts of the vessel and the casing arm, a cap arranged over the vessel, said cap being provided with diametrically oppositely arranged openings located in the axis of the first two arms of the casing, the hot soldered junctions of the element being in alinement with aforesaid axis, and a diaphragm arranged in the casing arm facing the hot body, said diaphragm being adjustable in the direction of the arm axis.

7. In a pyrometer of the character described in combination a thermo element, a vessel containing said element, two lead-in wires for conducting the current of said element away from the vessel, a conductor of one kind of material soldered to one of the shanks of said thermo element and to one of said lead-in wires, and another conductor of a material different from the first conductor, soldered to the other shank of said thermo element and to the other of said lead-in wires, the soldered junctions between said conductors and the shanks of said thermo element acting as cold junctions of said thermo element and being adapted when heated to supply an additional compensating electromotive force.

8. In a pyrometer of the kind described in combination, a thermo element comprising a nickel chromium wire and a constantan wire and compensating means comprising a copper conductor and a nickel conductor, said copper conductor being connected with said nickel chromium wire and said nickel conductor being connected with said constantan wire.

9. In a pyrometer of the character described in combination a T-shaped casing having an opening in one of its arms adapted to be directed towards the hot body and an eye-piece in the end of the opposed arm, said casing also having an opening in its middle arm, a thermo element comprising two conductors having a hot and a cold soldered junction, a vessel containing said thermo element, a socket arranged at one end of said vessel, said vessel being inserted in the opening of said middle arm, a cap covering the opening and said outer part of the socket, and a resistance connected in parallel to the two conductors of said thermo element and adapted, at rising temperature, to increase its resistance value to such an extent, that the current supplied by the thermo element increases in proportion to the increasing temperature of the cold soldered junction of said thermo element.

10. In a pyrometer of the kind described in combination, a thermo element, a vessel enclosing said element and means for compensating the drop of electromotive force of said thermo element arising in consequence of the action exerted by the temperature upon the cold soldered junctions of said thermo element, said means being enclosed within said vessel.

11. In a pyrometer of the kind described in combination, a thermo element, a vessel enclosing said element, a socket on said vessel and means for compensating the drop of electromotive force of said thermo element arising in consequence of the action of temperature exerted on the cold soldered junction of said thermo element, said compensating means being disposed on said socket and adjustable from the outside.

12. A thermo element for pyrometers of the character described comprising an evacuated vessel, a socket at one end of said vessel, means for compensating the drop of electromotive force of said element, said means being arranged at the bottom of said socket in easily accessible position, and a metal cap supported by said socket for covering the entire vessel, said cap being provided with an opening for the passage of the hot rays to the hot soldered junctions of said thermo element.

In testimony whereof I affix my signature.

GEORG KEINATH.